July 30, 1957

M. C. VANCE 2,800,939

ASPARAGUS BUTT CUTTER

Filed Oct. 20, 1955

Merton C. Vance
INVENTOR.

BY

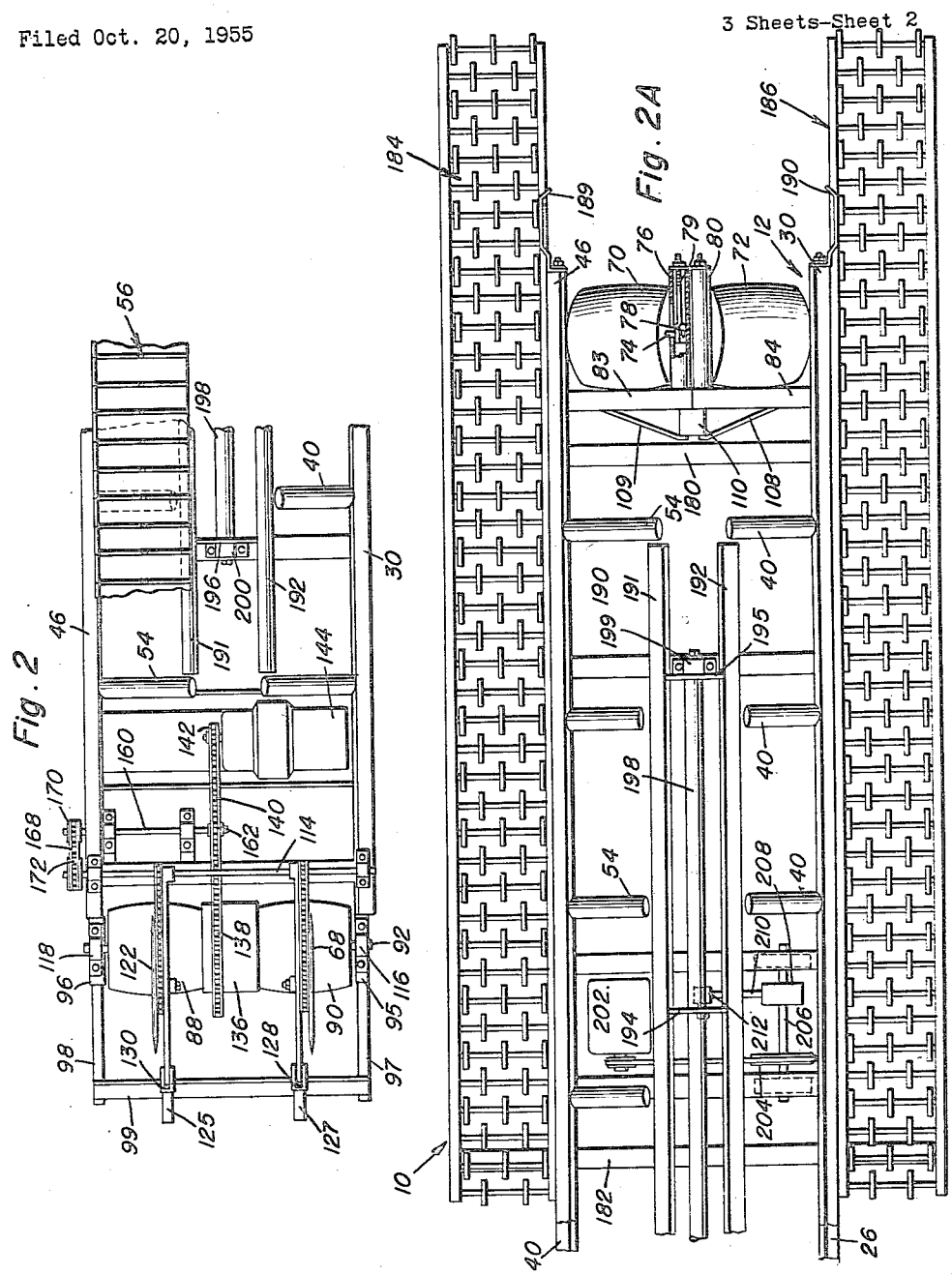

July 30, 1957
M. C. VANCE
2,800,939
ASPARAGUS BUTT CUTTER
Filed Oct. 20, 1955
3 Sheets-Sheet 3
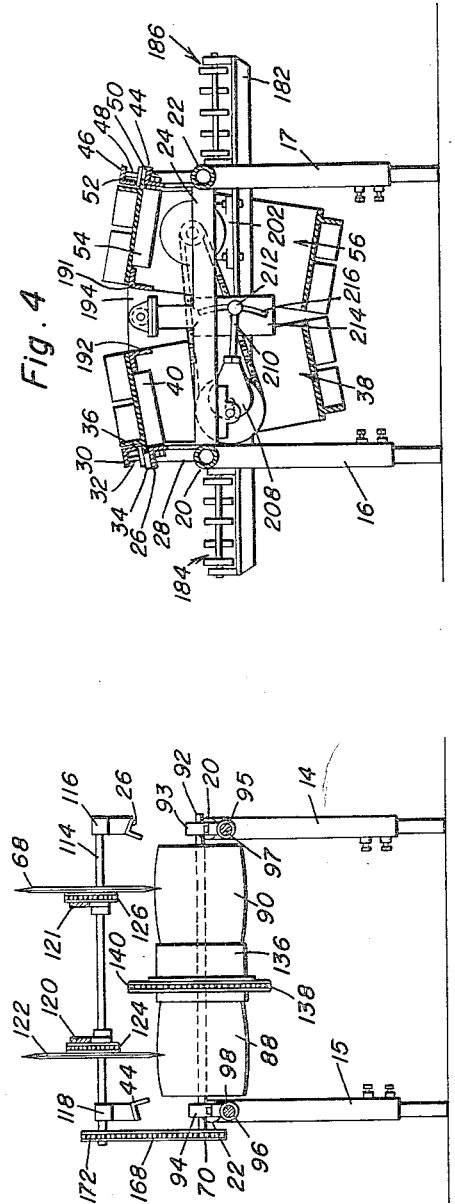
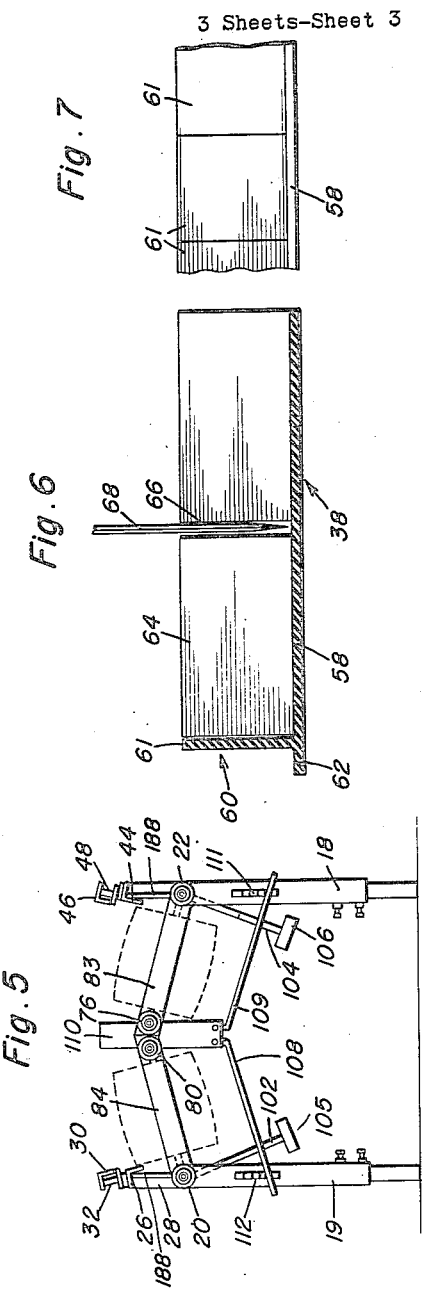
Merton C. Vance
INVENTOR.
BY Clarence A. O'Brien
and Harvey B. Jackson
Attorneys

United States Patent Office 2,800,939
Patented July 30, 1957

2,800,939

ASPARAGUS BUTT CUTTER

Merton C. Vance, Grandview, Wash., assignor to Prosser Packers, Inc., Prosser, Wash., a corporation of Washington Application October 20, 1955, Serial No. 541,675

2 Claims. (Cl. 146—82)

This invention relates to a trimming machine, and particularly to a machine which is constructed and arranged to cut the butts from asparagus stalks in such manner that the spears can easily be kept separate from the butts.

An object of this invention is to provide an asparagus trimming or cutting machine designed to trim asparagus to any predetermined length as it comes from the fields to the receiving stations or processing plants, the machine being more compact than those presently available and having a higher capacity with less maintenance and noise.

A more specific object of the invention is to provide an asparagus trimming machine which includes a frame or support having provision to accommodate an endless conveyor and means for elevating one edge of the conveyor so that it is transversely inclined, thereby sliding the asparagus toward one edge of the conveyor with the heads resting on a flange of the conveyor, the conveyor as it approaches a cutter becoming horizontal, in which position, the butts of the asparagus stalks are severed. Also, with modification of the conveyor and adjustment of the cutter, the machine is readily adaptable to trim broccoli, carrots and other vegetables.

A further object of this invention is to provide an asparagus cutter as described above which is characterized by a shaker which vibrates the upper flight of the conveyor in order to encourage the asparagus to slide toward the lower edge of the conveyor so that it may be cut to a uniform length.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a fragmentary top view of the machine of Figure 1, parts being omitted to illustrate detail which would otherwise be hidden;

Figure 2A is a fragmentary top view of the machine of Figure 1 and shows the omitted portion of Figure 2;

Figure 3 is a transverse sectional view taken substantially on the plane of line 3—3 of Figure 1 and in the direction of the arrows;

Figure 4 is a transverse sectional view taken on the plane of line 4—4 of Figure 1 and in the direction of the arrows;

Figure 5 is an end view of the machine of Figure 1 and taken substantially on the plane of line 5—5 of Figure 1 and in the direction of the arrows;

Figure 6 is an enlarged transverse sectional view of the conveyor with a part of the cutter illustrated in the cutting position therein; and Figure 7 is a fragmentary elevational side view of the conveyor.

Figure 1:
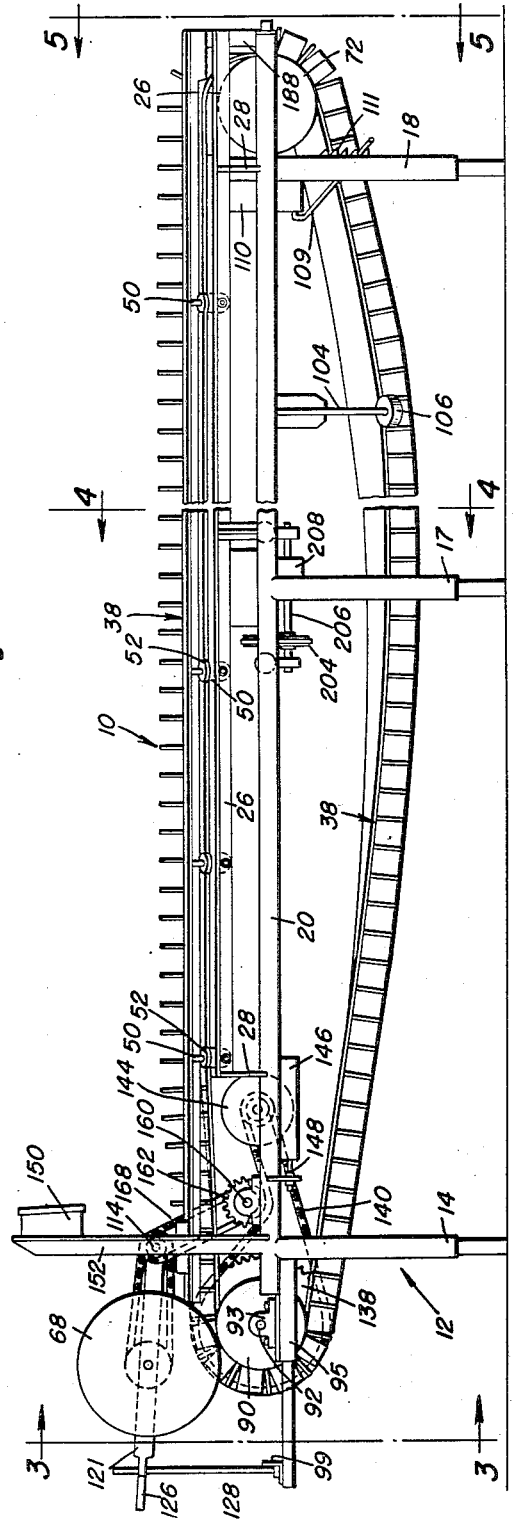
Figure 1 is a side view of the asparagus trimming machine.

The asparagus trimming or cutting machine 10 which embodies the principles of the invention, consists of a frame or support 12 which has legs 14, 15, 16, 17, 18 and 19 respectively. Each leg is extensible and adjustable by means of setscrews or other equivalent expedients. In this way, the machine may be leveled before it is put into operation and when it is being set up in the processing plant or receiving station. The legs depend from sides 20 and 22 that are parallel to each other. It is preferred that the sides 20 and 22 be made of tubular stock, as are all of the legs. Suitable and sufficient transverse supports extend between and are secured to the sides 22 and 20 in order to form a rigid structure. Shaker support assemblies are secured to the sides 20 and 22 respectively. The assembly on the side 20 comprises an angle rail 26 held parallel to and above side 20 by means of vertical legs 28 which may be welded or otherwise rigidly secured to the angle rail 26 and the side 20. Mounted above and slightly spaced from the angle rail 26 is a parallel angle rail 30 slightly longer than rail 26 (Figure 1) and arranged at approximately the same angle. A plurality of shanks 32 are secured to one flange of the angle rail 30 and to a number of blocks 34 that are welded to the corresponding flange of angle rail 26. Rollers 36 which contact belt 38 (Figure 6) are mounted on the shanks 32. A number of cylindrical rollers 40 are secured to the lower angle rail 26 and similar to the wheel-like rollers 36, the cylindrical rollers 40 are inclined upwardly toward the center of the machine 10.

The belt roller support assembly on the side 22 is identical in construction. It includes parallel angle rails 44 and 46 which are held spaced from each other by means of spindles or shanks 48 secured to a flange of the rail 46 and to blocks 50 welded to rails 44. Wheel-like rollers 52 are mounted for rotation on the shanks 48, while cylindrical rollers 54 are carried on spindles which are secured to the angle rail 44. Belt 56 identical to belt 38 is disposed on the cylindrical rollers 54 while the wheel-like rollers 52 support a side thereof.

Each belt consists of an endless web 58 which is preferably rubber or a rubber-like composition. A vertical wall 60 made of a plurality of upstanding adjacent panels 61 is formed near, but spaced slightly from one edge of the endless web 58. This leaves a flange 62 along that edge of the belt. A number of equally spaced vertical separators 64 rise from the outer surface of the endless web 58, thereby separating the web into compartments. Each separator has a slot 66 extending through it in which to accommodate a rotary, cylindrical knife 68 whose function is to shear the butts from the shanks of the asparagus.

At the loading end of the machine, there are main pulleys 70 and 72 around which the endless conveyors 38 and 56 are entrained. Each of the main pulleys is adjustably carried so that the endless conveyors may be tightened. In this regard, pulley 70 is mounted on its shaft 74, the latter having ends disposed in slots which are formed in side 22 and tube 76, respectively. Each end of the pulley shaft 74 is carried in a sliding block 78, the latter being movable by means of a bolt 79 operatively connected therewith and threaded in an end of its housing, the housing being side 22 in one instance and tube 76 in the other instance. The roller 72 is adjustable in a similar manner. The tube 76 and tube 80 for the roller 72 are held parallel to each other and parallel to the sides 20 and 22. Angular cross-members 83 and 84 are secured to each other at their inner ends and to the sides 20 and 22 of the main frame or support 12. They are at the same angle as the rollers 40 and 54.

As the endless conveyors extend over the main pulleys 70 and 72, the flange 62 thereof falls beneath the wheel-like rollers 36 and the wheel-like rollers 52 on each side of the machine. The main load of the upper flight of each conveyor is carried by the groups of rollers 40 and 52, while the lower surface of flange 62 of belt 38 and the corresponding surface of the corresponding flange of conveyor 56 rides on the top surface of the angle rails in the respective shaker assemblies.

The main supporting roller 136 having two crowns 88 and 90 is mounted for rotation on the shaft 92, the latter being supported in bearings 93 and 94 which are secured to sleeves 95 and 96. These sleeves (Figures 1 and 3) are welded or otherwise rigidly secured to the sides 20 and 22 and project as continuations thereof from the main support frame 12. Shanks 97 and 98 are fitted in the bores of the sleeves 95 and 96 and are bridged by cross-member 99 at their outer ends.

The main support roller 136 with its crowns 90 and 88 for the endless conveyors 38 and 56 are mounted for rotation about a horizontal axis. Accordingly, even though the upper flight of such endless conveyor is tilted at an inclination with respect to the horizontal for its main travel, at the discharge end of the machine, it is horizontal. Endless conveyors of the type described herein are quite heavy. Accordingly, at suitable locations, rods 102 and 104 are secured to the sides of the main support 12 and have guide rollers 105 and 106 secured thereto which ride on the sides of the endless conveyors at the projecting flanges thereof. Adjustable belt cleaning rods 108 and 109 are secured at their inner ends to a vertical support post 110 which is carried by the cross-members 83 and 84, and the opposite ends of the rods 108 and 109 are engaged with latches 111 and 112 on legs 18 and 19 of the support 12.

A cutter shaft 114 is disposed in bearings 116 and 118, the latter carried by the ends of angle rails 30 and 46 which protrude beyond the ends of angle rails 26 and 44, respectively. Levers 120 and 121 are mounted for free rotation on the shaft 114, and they have the rotary cutters 68 and 122, respectively, thereon. These cutters are disposed on spindles carried by the levers 120 and 121, and they have sprockets 124 and 126 drivingly connected therewith. The outer ends of the levers 120 and 121 are furnished with spring loaded detents 125 and 127 which engage vertical rods 128 and 130 releasably holding the levers in place. These rods are secured to the angle cross-member 99 and function to hold the levers in place until the cutters 68 or 122 strike an object, for example, a stone, whence the spring loaded detents slip and allow the lever involved to be moved upwardly in order to avoid serious damage to the blade.

The main roller 136 with its crowns 88 and 90 constitute drive rollers, and roller 136 has a sprocket 138 fixed to the center portion. A chain 140 is entrained around the sprocket 138 and also around a drive sprocket 142 which is connected to the shaft of motor 144. This motor is mounted on a carriage 146 which is adjustable by rotation of screws 148 with respect to the main support frame 12. In this way, the chain 140 is tightened to the necessary tension. A main control box 150 on standard 152 is used for controlling all parts of the asparagus cutting machine. This standard is welded or otherwise suitably secured to a part of the main support 12 and in a readily accessible location.

As motor 144 is actuated, it drives the chain 140 which in turn rotates the sprocket 138 and ultimately, the drive pulley 136 together with its crowns 88 and 90 for the endless conveyors 38 and 56. At the same time, the lay shaft 160, carried in bearings on support 12, is rotated inasmuch as a sprocket 162 is secured to it, and this sprocket is engaged with the chain 140. Rotation of the lay shaft 160 is transferred to the shaft 114 by means of chain 168 that interconnects sprockets 170 and 172 which are secured respectively to lay shaft 160 and shaft 114. Accordingly, through this transmission, the cutters 68 and 122 will be operated simultaneously with the endless conveyors 38 and 56.

The two transverse track supports 180 and 182 are secured to the sides 20 and 22 of the main support frame 12, and these track supports hold roller conveyors 184 and 186 on the sides of the machine 10. Boxes of asparagus are placed on the roller conveyors 184 and 186 and the guides 189 and 190 at the inlet ends of the roller conveyors are used to assure that the boxes will not interfere with the proper functioning of the endless conveyors 38 and 56. Operators standing alongside of the roller conveyors 184 and 186 place asparagus from the boxes upon the endless conveyors and specifically, in the compartments formed by the separators 64. The asparagus is placed with the head end toward the outside of each conveyor, that is, toward the vertical wall, as at 61. As the endless conveyors move around the rollers 70 and 72, it is guided in its travel by means of the belt guides 188 (Figures 1 and 5) which extend between the angle rails of the two belt roller supporting assemblies. This further assures proper belt alignment at all times.

Due to the angular disposition of the upper flight of the endless conveyors, the asparagus will slip toward the outer edges of the conveyors. To make certain that the asparagus moves as far as possible in this direction, means for shaking the upper flights of the endless conveyors are carried by the main support frame 12. The means consist of a pair of shaker rails 191 and 192 respectively, the rails having upper flanges which are arranged at the same angles as the axes of rotation of cylindrical rollers 40 and 54. They underlie the inner edges of a portion of the upper flight of each conveyor and are connected together by means of transverse brackets 194, 195, and 196 which are welded in place. A tubular center spacer 198 is located between the shaker rails 191 and 192 and between the end brackets 195 and 196. The tubular spacer has spindles or equivalent means mounting the ends thereof in rubber bearings 199 and 200 that are carried by cross-members of the main support 12. This mounts the shaker including tubular spacer 198, brackets 194, 195 and 196 and shaker rails 191 and 192 as a unit for oscillation.

The means for imparting oscillatory movement to the shaker consists preferably of a motor 202 that is adjustably mounted on the support 12, the motor either chain or belt driving a pulley 204, the latter being secured to the shaft 206 which is mounted in bearings on the main support. An eccentric drive 208 actuates drive rod 210 which is connected by means of a bolt and nut assembly through a rubber mounted bearing 212 to the shaker arm 214. This arm forms a continuation of the bracket 194 and has a curved slot 216 in it. This slot accommodates the bolt and nut assembly going through rubber bearing 212. Therefore, the stroke of the shaker arm 214 is adjusted by loosening the bolt and nut assembly in rubber bearing 212 and relocating the same in another part of the slot 216. The controls for the motor 202 are at the control box 150 together with the other controls of the asparagus cutting machine.

In operation, asparagus in boxes is placed on the roller conveyors from which it is disposed on the endless conveyors 38 and 56. It is placed in the pockets of the upper flights of these conveyors with the head ends toward the sides of the machine. Actuation of the shaker assures that the asparagus will slide inwardly as far as possible in the endless conveyor compartments. Then, as the upper flight moves toward the cutting station, it becomes horizontal. Movement of the conveyor through the cutting station causes the cutters 68 and 122 to shear the butt ends of the asparagus from the shanks. The shanks with the heads are collected at the discharge end of the machine.

The foregoing is considered as illustrative only of the principles of the invention. Further, since numerous modifications and changes will readily occur to those skilled in the art, it is not desired to limit the invention to the exact construction and operation shown and de-

What is claimed as new is as follows:

1. An asparagus trimming machine comprising a support, an endless conveyor carried by said support and having compartments therein, said compartments opening upwardly in the upper flight of said conveyor and having an end wall, means on which the upper flight of said conveyor is disposed for tilting said conveyor transversely to slide the asparagus toward said wall of said conveyor, means carried by said support for severing the outer ends of the asparagus as it is moved with said conveyor to the discharge end of the machine including a knife which severs the asparagus when the conveyor moves to cause the compartments to be bisected by said knife, a shaker operatively connected with the upper flight of said conveyor for urging the asparagus deeply into the compartments of the conveyor so that when said cutter severs the ends of said asparagus, the remainder of the asparagus is of uniform length, said shaker including a spacer, means pivotally mounting the ends of said spacer on said frame and longitudinally of said conveyor, a pair of spaced rails on which the inner edges of the upper flight of said conveyor are disposed, and means securing said pair of rails to said spacer.

2. The machine of claim 1 wherein there is a motor on said support, drive means including an eccentric operatively connected to and driven by said motor, said means securing said pair of rails to said spacer including a plurality of plates, and said drive means being connected with one of said plates.

References Cited in the file of this patent

UNITED STATES PATENTS

| | | |
|---|---|---|
| 779,666 | Robins | Jan. 10, 1905 |
| 1,320,990 | Butler | Nov. 4, 1919 |
| 1,950,729 | Johnson | June 30, 1930 |
| 2,556,266 | Furtado | June 12, 1951 |